(No Model.)

A. WALTER.
BUGGY TOP JOINT.

No. 345,398. Patented July 13, 1886.

WITNESSES
Ed. A. Newman
Al. C. Newman

INVENTOR
Adolph Walter
By his Attorneys
Baldwin, Hopkins, & Peyton

UNITED STATES PATENT OFFICE.

ADOLPH WALTER, OF FREMONT, OHIO.

BUGGY-TOP JOINT.

SPECIFICATION forming part of Letters Patent No. 345,398, dated July 13, 1886.

Application filed April 1, 1886. Serial No. 197,460. (No model.)

*To all whom it may concern:*

Be it known that I, ADOLPH WALTER, of Fremont, in the county of Sandusky and State of Ohio, have invented an Improved Buggy-Top Joint, of which the following is a specification.

Where the hinge-connection between the two portions of a jointed buggy-top brace is formed by a bolt which can turn in the socket in each section of the brace the parts soon become worn and loose, and such a construction is objectionable. In order to overcome this difficulty, it has heretofore been proposed to form the socket in one of the sections square, and in the other section round, and to use a bolt having one portion square and the other portion round, so that only one of the sections could rock on the bolt, the bolt and the section having the square socket being held rigid relatively to each other. While this construction may meet the requirements to a certain extent, there is more or less difficulty in manufacture, and in putting the parts together more or less care is required, because if the square part of the bolt comes in contact with the section of the brace having the round socket the parts are liable to bind.

My improvement consists in a joint which is simple in construction and efficient and practical in operation.

Figure 1:
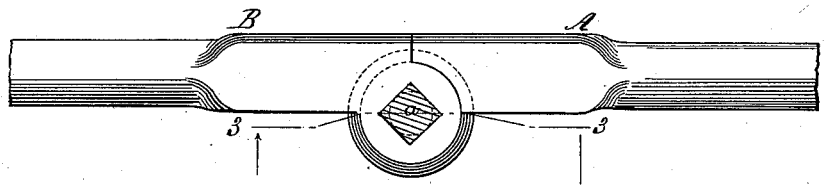
Figure 2:
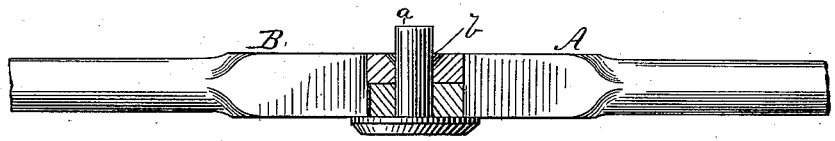
Figure 3:
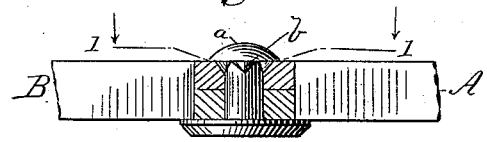

In the accompanying drawings, Figure 1 is a side view, partly in section, on the line 1 1 of Fig. 3, of my improved buggy-top joint. Fig. 2 is a longitudinal section, representing the parts before the rivet or hinge-pin is swaged down. Fig. 3 is a sectional view on the line 3 3 of Fig. 1.

The section A of the buggy-brace is formed with an ordinary round socket, as usual, as is also the section B. The latter section, however, has formed around the socket on the outer side of the brace a square or angular depression, $b$, as seen in the several figures.

Fig. 2 shows the parts assembled, and the joint is completed by swaging down the head $a$ of the hinge or pivot-bolt. The act of thus riveting down the head swells or flows the metal of the bolt into the square or angular socket on the section B of the brace, so that the bolt and section B are held rigidly with reference to each other, while the section A is free to turn upon the bolt.

In Fig. 3 the parts are shown after the end of the bolt has been swaged down.

In Fig. 1 the section-lines indicate a sectional view on the line 1 1 of Fig. 3—that is, with a rounded top, $a$, of the bolt cut off flush with the face of the section B, thus showing clearly the square depression of socket around the bolt-hole, which is indicated by the dotted lines. Of course any shaped depression in the section B which will prevent the bolt from turning with reference to that section when swaged down may be used.

I claim as my invention—

The combination of the sections A B, one of which has a square or angular depression around its bolt-hole, and the pivot-bolt having its end upset or swaged into such socket, for the purpose set forth.

In testimony whereof I have hereunto subscribed my name.

ADOLPH WALTER.

Witnesses:
  J. V. BEERY,
  AMELIA MILLER.